(12) United States Patent
Nakamura et al.

(10) Patent No.: US 8,893,545 B2
(45) Date of Patent: Nov. 25, 2014

(54) GLOW PLUG WITH COMBUSTION PRESSURE SENSOR

(75) Inventors: Yoshihiro Nakamura, Komaki (JP); Shunsuke Maeda, Toyota (JP); Masayoshi Matsui, Ichinomiya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 13/996,102

(22) PCT Filed: Feb. 21, 2012

(86) PCT No.: PCT/JP2012/054057
§ 371 (c)(1),
(2), (4) Date: Jun. 20, 2013

(87) PCT Pub. No.: WO2012/115080
PCT Pub. Date: Aug. 30, 2012

(65) Prior Publication Data
US 2013/0319094 A1    Dec. 5, 2013

(30) Foreign Application Priority Data

Feb. 25, 2011 (JP) .................... 2011-039118

(51) Int. Cl.
*G01M 15/00* (2006.01)
*G01M 15/08* (2006.01)
*F23Q 7/00* (2006.01)

(52) U.S. Cl.
CPC .............. *G01M 15/08* (2013.01); *F23Q 7/001* (2013.01)
USPC ..................................... 73/114.19; 73/114.18

(58) Field of Classification Search
USPC ......................................... 73/114.18, 114.19
See application file for complete search history.

(56) References Cited

U.S. PATENT DOCUMENTS

| 7,185,621 B2 * | 3/2007 | Yamada et al. ........... 123/145 A |
| 7,581,520 B2 * | 9/2009 | Kern et al. ................ 123/145 A |

(Continued)

FOREIGN PATENT DOCUMENTS

| JP | 2006-10306 A | 1/2006 |
| JP | 2008-525758 A | 7/2008 |

(Continued)

OTHER PUBLICATIONS

International Search Report for PCT/JP2012/054057 dated Apr. 10, 2012.

(Continued)

*Primary Examiner* — Freddie Kirkland, III
(74) *Attorney, Agent, or Firm* — Sughrue Mion, PLLC

(57) ABSTRACT

A seal member (60) has a dual-tube structure consisting of an outer tubular seal member (160a) and an inner tubular seal member (160b); the outer tubular seal member (160a) is welded, at its rear end portion, to the inner circumferential surface of a forward-end housing (131), thereby forming a housing-side joint W2; the inner tubular seal member (160b) is welded, at its forward end portion, to a forward end portion of the outer tubular seal member (160a), thereby forming an inter-tubular-seal-member joint W3; and the inner tubular seal member (160b) is welded, at its portion located rearward of the joint W3, to the outer circumferential surface of the heater (10), thereby forming a heater-side joint W1. An action of pressing the heater forward is effected on the basis of an axial dimension L1 between the joints W2 and W1 shorter than an axial dimension between the joints W2 and W3 and is, therefore, mitigated.

6 Claims, 10 Drawing Sheets

(56) References Cited

U.S. PATENT DOCUMENTS

| | | | |
|---|---|---|---|
| 7,635,826 B2 * | 12/2009 | Yamada et al. | 219/270 |
| 7,712,444 B2 * | 5/2010 | Kern et al. | 123/145 A |
| 8,205,490 B2 * | 6/2012 | Mueller | 73/114.19 |
| 8,250,909 B2 | 8/2012 | Kern et al. | |
| 8,356,511 B2 * | 1/2013 | Ramond et al. | 73/114.16 |
| 8,429,956 B2 * | 4/2013 | Borgers et al. | 73/114.18 |
| 8,459,104 B2 * | 6/2013 | Cheng et al. | 73/114.19 |
| 8,519,306 B2 * | 8/2013 | Itoh et al. | 219/267 |
| 8,567,237 B2 * | 10/2013 | Maeda et al. | 73/114.18 |
| 2008/0302323 A1 | 12/2008 | Kern et al. | |
| 2011/0005308 A1 | 1/2011 | Kern et al. | |

FOREIGN PATENT DOCUMENTS

| | | |
|---|---|---|
| JP | 2009-520941 A | 5/2009 |
| JP | 2009-527749 A | 7/2009 |
| JP | 2010-139148 A | 6/2010 |
| WO | 2007/073959 A1 | 7/2007 |

OTHER PUBLICATIONS

Office Action ("Notification of Reason for Rejection") mailed on Jul. 9, 2013 for corresponding Japanese Patent Application No. 2012-530034.

* cited by examiner

GLOW PLUG WITH COMBUSTION PRESSURE SENSOR

CROSS REFERENCE TO RELATED APPLICATIONS

This application is a National Stage of International Application No. PCT/JP2012/054057 filed Feb. 21, 2012, claiming priority based on Japanese Patent Application No. 2011-039118 filed Feb. 25, 2011, the contents of all of which are incorporated herein by reference in their entirety.

TECHNICAL FIELD

The present invention relates to a glow plug having a combustion pressure sensor (a glow plug with a combustion pressure sensor), adapted to promote ignition within a combustion chamber of an engine and to sense (detect) combustion pressure as well. Specifically, the present invention relates to a glow plug having a combustion pressure sensor which is mounted to an engine head such that its heater is exposed to the interior of a combustion chamber for the purpose of promoting ignition of fuel and receiving, through the heater, combustion pressure (combustion gas pressure) in the combustion chamber so as to sense the combustion pressure by means of a sensor, such as a piezoelectric element or a strain sensor (gauge), disposed within a housing which holds the heater.

BACKGROUND ART

There are known various types of such a glow plug having a combustion pressure sensor (hereinafter, may be referred to merely as a glow plug) (refer to, for example, Patent Document 1). FIG. 9 is a longitudinal, partially sectional view showing a simplified sectional structure of a glow plug 901 of the same type. The glow plug 901 of FIG. 9 is configured such that a rodlike (circular columnar) heater (e.g., a metal heater or a ceramic heater) 10 which generates heat through energization is disposed within a tubular housing 110 with its forward end (an end on a side toward a combustion chamber, or a lower end in FIG. 9) 10a projecting from a forward end 136 of the housing 110. In the glow plug 901, in consideration of transmission of a received combustion pressure to a sensor disposed at the rear end of the heater 10, thermal expansion of the heater 10, etc., the heater 10 is disposed within the housing 110 in such a manner as to be displaceable in the direction of its axis G (axial direction), by a very small amount. That is, the heater 10 is disposed with a gap (annular gap) formed in cooperation with the inner circumferential surface of the housing 110. A sensing means; for example, a piezoelectric element 40, for detecting pressure generated as a result of combustion pressure pressing the heater 10 rearward from the forward end 10a is disposed rearward of the heater 10. This configuration is designed as follows: a force generated as a result of combustion pressure pressing the heater 10 rearward compresses the piezoelectric element 40, and an electric signal generated according to a change in compressive force applied to the piezoelectric element 40 is measured, whereby the combustion pressure is detected.

Incidentally, in the glow plug 901, there must be prevented entry of high-temperature, high-pressure combustion gas from the forward end 136 of the housing 110 into a rear interior region of the housing 110 through the above-mentioned annular gap between the heater 10 and the inner circumferential surface of the housing 110 (i.e., a seal must be established). In order to meet this requirement, usually a certain seal member is disposed in the annular gap between the heater 10 and the inner circumferential surface of the housing 110. For example, in the glow plug 901 of FIG. 9, as shown in the enlarged view in FIG. 9, and in FIG. 10, a seal member 60 for preventing entry of combustion gas into a rear interior region is disposed in a diameter-expanding annular space K2 which is formed in a diameter-expanding manner within a forward-end housing 131 of the housing 110. Meanwhile, in order to allow displacement in the direction of the axis G of the heater 10 in relation to the housing 110, the seal member 60 is formed of a heat-resistant member having a sufficiently flexible annular membrane, such as a metal membrane capable of being readily deformable in the axial direction (e.g., a membrane of SUS630); specifically, a diaphragm or bellows. As shown in the enlarged view in FIG. 9, and in FIG. 10, the seal member 60 has a small-diameter tubular portion 65 located on the forward side, a large-diameter tubular portion 61 located on the rear side, and an annular membrane 63 having a curved section and disposed between the small-diameter tubular portion 65 and the large-diameter tubular portion 61 in such a manner as to partition the diameter-expanding annular space K2 into axially forward and rearward parts. In the above-mentioned diameter-expanding annular space K2, the small-diameter tubular portion 65 of the seal member 60 is joined to the heater 10 at a predetermined position W1 along the outer circumference of the heater 10 by, for example, welding (laser welding), and the large-diameter tubular portion 61 of the seal member 60 is joined to the housing 110 (the forward-end housing 131) at a predetermined position W2 along the circumferential direction by, for example, welding (laser welding). This joining ensures a seal at the inner circumferential surface of the forward end 136 of the housing 110. Hereinafter, the predetermined position W1 may be referred to as the heater-side joint, and the predetermined position W2 as the housing-side joint.

In displacement of the heater 10 in the direction of the axis G (axial direction) in relation to the housing 110 with the seal member 60 intervening therebetween, while a seal is maintained, mainly the annular membrane 63 is deformed so as to allow the displacement of the heater 10 in the direction of the axis G. That is, the seal member 60 plays a role of shutting off a high-temperature, high-pressure combustion gas which enters a space (annular gap) between the outer circumferential surface of the heater 10 and the inner circumferential surface of a portion of the housing 110 located toward the forward end 136, and a role of allowing displacement of the heater 10 in the direction of the axis G. Although unillustrated, according to a certain configuration, the seal member is disposed between the inner circumferential surface of the housing and the outer circumferential surface of the heater 10 at a position located deep in the housing away from the forward end of the housing, thereby establishing a seal therebetween. Such a configuration does not require provision of the aforementioned seal member 60 at a portion of the housing located toward the forward end of the housing. However, depending on the position of the seal member disposed deep in the housing, there is usually required the provision, in addition to the seal member, of a holding member for holding the heater while allowing axial displacement of the heater, at the forward end of the housing or at a portion of the housing located toward the forward end of the housing. That is, a configurational feature having easy deformability similar to that of the above-mentioned seal member must be provided. This is for the following reason: since the heater is in a loose fit condition in the housing, and the projecting forward end of the heater is a free end, in order to stably hold such a heater, the heater must be held (supported) at the forward end of the housing or at a portion of the housing located toward the forward end, in addition to provision of the seal member disposed deep in the housing. As will be understood from this requirement, the above-mentioned seal member 60 also plays a role of holding the heater; therefore, the seal member 60 can also be said to be a holding member for holding the heater at the forward end of the housing or at a portion of the housing located toward the forward end.

PRIOR ART DOCUMENT

Patent Document

Patent Document 1: Japanese Unexamined Patent Application Publication No. 2009-527749

SUMMARY OF THE INVENTION

Problems to be Solved by the Invention

As is apparent from the above description, the seal member 60 is disposed between the inner circumferential surface of the housing 110 and the outer circumferential surface of the heater 10 in such a manner as to be directly hit by a high-temperature, high-pressure combustion gas (blast) which enters from the forward end 136 as a result of execution of a combustion cycle of an engine, so that the seal member 60 undergoes thermal shock. Meanwhile, in order to ensure easy deformability, the seal member 60, including the annular membrane 63, is greatly thin-walled as compared with other component members (portions), such as the heater 10 and a forward end portion (the forward-end housing 131) of the housing 110. For example, the annular membrane 63 has a thickness of only about 0.1 mm to 1.0 mm. Thus, when the seal member 60 is directly hit by a high-temperature, high-pressure combustion gas in execution of a combustion cycle, as compared with other component members, such as the heater 10 and the housing 110, the seal member 60 assumes high temperature very quickly; i.e., instantaneously; therefore, the seal member 60 instantaneously assumes a relatively large thermal expansion (hereinafter, may be referred to as instantaneous thermal expansion). This instantaneous thermal expansion is repeated in execution of combustion cycles.

Meanwhile, the heater 10 has the projecting forward end 10a which is a free end, and the seal member 60 having the above-mention configuration has the small-diameter tubular portion 65 which is located on the forward side and is fixed, by welding, to the outer circumferential surface of the heater 10 at the predetermined position W1, and the large-diameter tubular portion 61 which is similarly fixed to the housing 110 at the predetermined position W2. Thus, as represented by the dash-dot line in FIG. 10, as a result of direct hit by combustion gas, the seal member 60 instantaneously undergoes a relatively large instantaneous thermal expansion directed forward with respect to the direction of the axis G (in the direction of the outlined arrow in FIG. 10). As a result, the heater 10 welded to the small-diameter portion 65 of the seal member 60 is subjected to an action of stress of pressing the heater forward (toward the free end) according to the instantaneous thermal expansion of the seal member 60. That is, as a result of the instantaneous thermal expansion of the seal member 60, the heater 10 is subjected to an action of forward tension at the heater-side joint W1 to the small-diameter portion 65; consequently, for example, a reference position in contact with the piezoelectric element 40 may be displaced (move) forward by a very small amount, or compressive force imposed on the piezoelectric element may vary.

Thus, in the glow plug 901 configured such that force generated by combustion pressure pressing the heater 10 rearward compresses the piezoelectric element 40, and an electric signal generated according to a change in the compressive force is measured or sensed, an action of instantaneous thermal expansion of the seal member 60 of pressing the heater 10 forward has an effect on the compression. In this manner, in the glow plug 901 having the above-mentioned configuration, drift arises in detection of combustion pressure, thereby raising a problem of deterioration in sensing accuracy. This problem similarly exists in the case where a combustion pressure sensor is not the piezoelectric element 40, but a strain sensor for sensing rearward strain of the heater 10.

This problem can be coped with by reducing instantaneous thermal expansion of the seal member 60. A conceivable means for the reduction is to reduce an axial joint-to-joint dimension L1 of the seal member 60 between the heater-side joint W1 and the housing-side joint W2; for example, to reduce (shorten) the axial length of the seal member 60 to thereby reduce the magnitude (length) of thermal expansion of the seal member 60 in the axial direction. However, in assembly of the glow plug, in view of a step of welding the seal member 60 in the form of a single tubular member, to the heater and to the housing, there is a limit on a reduction in the axial length of the seal member 60. Furthermore, reducing the axial length of the seal member 60 hinders easy axial deformability of the seal member, and, accordingly, hinders axial displacement of the heater 10 induced by combustion pressure. Also, as mentioned above, in the case where, while the seal member is disposed at a position located deep in the housing away from the forward end of the housing, the holding member for holding the heater is provided at the forward end of the housing or at a portion of the housing located toward the forward end of the housing, the holding member must also allow axial displacement of the heater as does the seal member 60. Such a holding member is not required to provide a seal as mentioned above, but must be formed from a sufficiently flexible material, such as metal membrane, as in the case of the above-mentioned seal member 60. Thus, the provision of such a holding member also involves a problem similar to the above-mentioned problem involved in the case of use of the seal member. Notably, as mentioned above, since the tubular "seal member" also plays the role of a holding member for holding the heater, the seal member hereinafter may also be referred to as the holding member.

The present invention has been conceived to solve the above problem, and an object of the invention is to provide a glow plug having a combustion pressure sensor configured such that there is mitigated an action that the above-mentioned tubular seal member (holding member) or the above-mentioned heater holding member provided in addition to the seal member presses the heater forward as a result of its instantaneous thermal expansion which arises in a cycle different from cycles of thermal expansion of other members, such as the heater and a forward end member of the housing, whereby accuracy in sensing combustion pressure can be enhanced.

Means for Solving the Problems

The invention described in claim 1 is a glow plug having a combustion pressure sensor in which a rodlike heater is disposed in a tubular housing in an axially displaceable manner with its forward end projecting from a forward end of the housing and with a gap retained between an inner circumferential surface of the housing and an outer circumferential surface of the heater and which has a sensor capable of sensing combustion pressure through detection of pressure or displacement generated as a result of the combustion pressure pressing the heater rearward from the forward end of the heater, wherein a holding member in a tubular shape formed in a deformable manner so as to allow the displacement of the heater and externally fitted to the heater so as to hold the heater is disposed in an annular gap between the outer circumferential surface of the heater and an inner circumferential surface of a forward end of the housing or a portion of the housing located toward the forward end of the housing, in such a manner as to partition the annular gap into axially forward and rearward parts, and is joined to the housing and to the heater along a circumferential direction, the glow plug being characterized in that the holding member has a dual-tube structure consisting of an inner tubular holding member and an outer tubular holding member;

one tubular holding member is joined, at its rear end portion, to the housing along the circumferential direction, thereby forming a housing-side joint;

the other tubular holding member is joined, at its forward end portion, to a forward end portion of the one tubular holding member along the circumferential direction, thereby forming an inter-tubular-holding-member joint; and the other tubular holding member is joined, at its portion located rearward of the inter-tubular-holding-member joint, to the outer circumferential surface of the heater along the circumferential direction, thereby forming a heater-side joint.

The invention described in claim 2 is a glow plug having a combustion pressure sensor in which a rodlike heater is disposed in a tubular housing in an axially displaceable manner with its forward end projecting from a forward end of the housing and with a gap retained between an inner circumferential surface of the housing and an outer circumferential surface of the heater and which has a sensor capable of sensing combustion pressure through detection of pressure or displacement generated as a result of the combustion pressure pressing the heater rearward from the forward end of the heater, wherein a holding member in a tubular shape formed in a deformable manner so as to allow the displacement of the heater and externally fitted to the heater so as to hold the heater is disposed in an annular gap between the outer circumferential surface of the heater and an inner circumferential surface of a forward end of the housing or a portion of the housing located toward the forward end of the housing, in such a manner as to partition the annular gap into axially forward and rearward parts, and is joined to the housing and to the heater along a circumferential direction, the glow plug being characterized in that the holding member has a dual-tube structure consisting of an inner tubular holding member and an outer tubular holding member;

one tubular holding member is joined, at its forward end portion, to the housing along the circumferential direction, thereby forming a housing-side joint;

the other tubular holding member is joined, at its rear end portion, to a rear end portion of the one tubular holding member along the circumferential direction, thereby forming an inter-tubular-holding-member joint; and the other tubular holding member is joined, at its portion located forward of the inter-tubular-holding-member joint, to the outer circumferential surface of the heater along the circumferential direction, thereby forming a heater-side joint.

The invention described in claim 3 is a glow plug having a combustion pressure sensor according to claim 1 or 2, wherein either one of the one tubular holding member and the other tubular holding member has such a cylindrical shape as to have a substantially fixed diameter along the axial direction, and the remaining one has such a tubular bell shape as to differ in diameter along the axial direction. The invention described in claim 4 is a glow plug having a combustion pressure sensor according to any one of claims 1 to 3, wherein the one tubular holding member and the other tubular holding member differ in axial length, and a material used to form the axially shorter tubular holding member is higher in thermal expansion coefficient than a material used to form the axially longer tubular holding member.

Effects of the Invention

According to the present invention, the holding member disposed in the annular gap between the inner circumferential surface of the housing and the outer circumferential surface of the heater has the above-mentioned dual-tube structure. That is, according to the present invention, the holding member has the dual-tube structure such that the housing-side joint and the heater-side joint are positioned with the inter-tubular-holding-member joint as the turn. Thus, since the axial dimension between the housing-side joint and the heater-side joint can be reduced accordingly, even though the inner and outer tubular holding members of the dual-tube structure thermally expand greatly in the axial direction, an increase in the axial distance between the housing-side joint and the heater-side joint due to thermal expansion can be smaller than increases in the overall axial lengths of the tubular holding members due to thermal expansion. Thus, according to the present invention, since an action of the holding member pressing the heater forward as a result of its thermal expansion can be mitigated more than in the case of the conventional member, the conventional problem of generation of drift in detection of combustion pressure can be mitigated accordingly; therefore, accuracy in sensing combustion pressure can be enhanced. That is, the conventional holding member having a single-tube structure must have a rather long axial length for the following reason: in view of a step of joining, by welding or the like, the holding member to the housing and to the heater at the housing-side joint and at the heater-side joint, respectively, and attainment of easy deformability in the axial direction of the holding member, the dimension (distance) between the joints must be sufficiently long. When such a holding member instantaneously assumes high temperature, quicker than do other members, such as the housing and the heater, and undergoes instantaneous thermal expansion, thermal stress generated in the holding member to press the heater forward inevitably becomes high, since the thermal stress is generated on the basis of the amount of thermal expansion corresponding to the dimension between the two joints.

By contrast, according to the present invention, by virtue of the above-mentioned configuration of the holding member, the axial distance L1 between the two joints (the housing-side joint and the heater-side joint) to the housing and to the heater, respectively, can be reduced. Therefore, even though the tubular holding members instantaneously undergo thermal expansion in such a manner as to expand forward, an increase in the distance L1 can be smaller than the amounts of thermal expansion of the tubular holding members, whereby thermal stress of pressing the heater forward can be reduced. In this manner, according to the present invention, even though the holding member instantaneously assumes considerably high temperature, relatively quicker than do other component members, such as the housing, and undergoes instantaneous thermal expansion, an action generated in such a manner as to press the heater axially forward can be reduced or prevented. As a result, in detection of combustion pressure, the conventional problem of generation of drift can be mitigated or prevented, whereby accuracy in sensing combustion pressure can be enhanced. In the case where the axial distance (dimension) L1 between the housing-side joint and the heater-side joint is 0 (the housing-side joint and the heater-side joint are located at the same axial position), and the two tubular holding members are formed from the same material, even though the amount of thermal expansion along the axial direction of the holding member (the tubular holding members) is large, theoretically, an action of pressing the heater forward does not arise; therefore, sensing accuracy can be further enhanced. As is understood from this feature, preferably, the distance L1 is as small as possible.

In the present invention, welding, such as laser welding, is a preferred means for joining the tubular holding members to the housing and to the outer circumferential surface of the heater along the circumferential direction and for joining the tubular holding members to each other along the circumferential direction. However, in addition to welding, this joining means may be brazing, crimping, press-fitting, or a combination thereof. In the present invention, the expression "joined along the circumferential direction" encompasses, in addition to the condition "joined continuously along the entire circumference," the condition "joined discontinuously along the circumferential direction" and the condition "joined continuously along the circumferential direction, but not along the entire circumference." The condition "joined continuously along the entire circumference" means the condition "joined continuously along at least full circumference or more" and, therefore, means that a seal is established between an axially forward part and an axially rearward part with respect to the joint. Therefore, in the case where the holding member is also the seal member, in order to ensure a seal (gastightness), the holding member is jointed to the housing and to the heater continuously along the entire circumference at the respective joints. The condition "joined discontinuously along the circumferential direction" means, for example, the condition "joined intermittently, usually at a plurality of positions, such as at three positions or at four positions, along the circumferential direction" and is applied to the holding member which is not required to provide a seal. That is, in the case where the holding member is a mere holding member provided in addition to the seal member, the holding member is not required to partition the annular space in a sealed condition. Thus, in this case, even though the holding member is disposed in such a manner as to partition the annular gap into axially forward and rearward parts and is joined to the housing and to the heater along the circumferential direction, there is no need to continuously join the holding member along the entire circumference. A typical example of the joining means is welding, such as laser welding.

MODES FOR CARRYING OUT THE INVENTION

Figure 4:
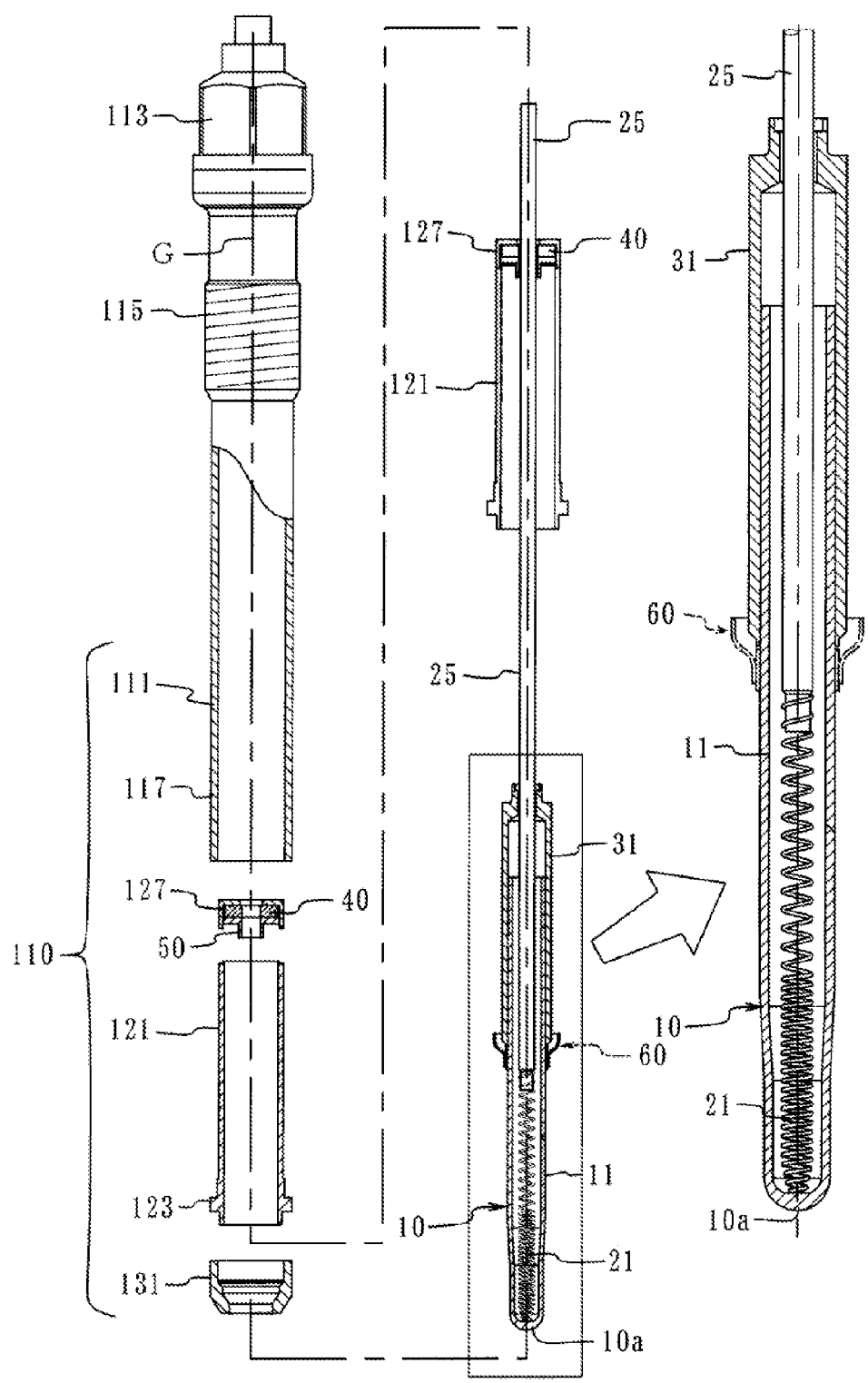
FIG. 4 Exploded view for explaining an example step of assembly of the glow plug of FIG. 1, showing a state before attachment of a sheath heater, etc., to a housing.
Figure 5:
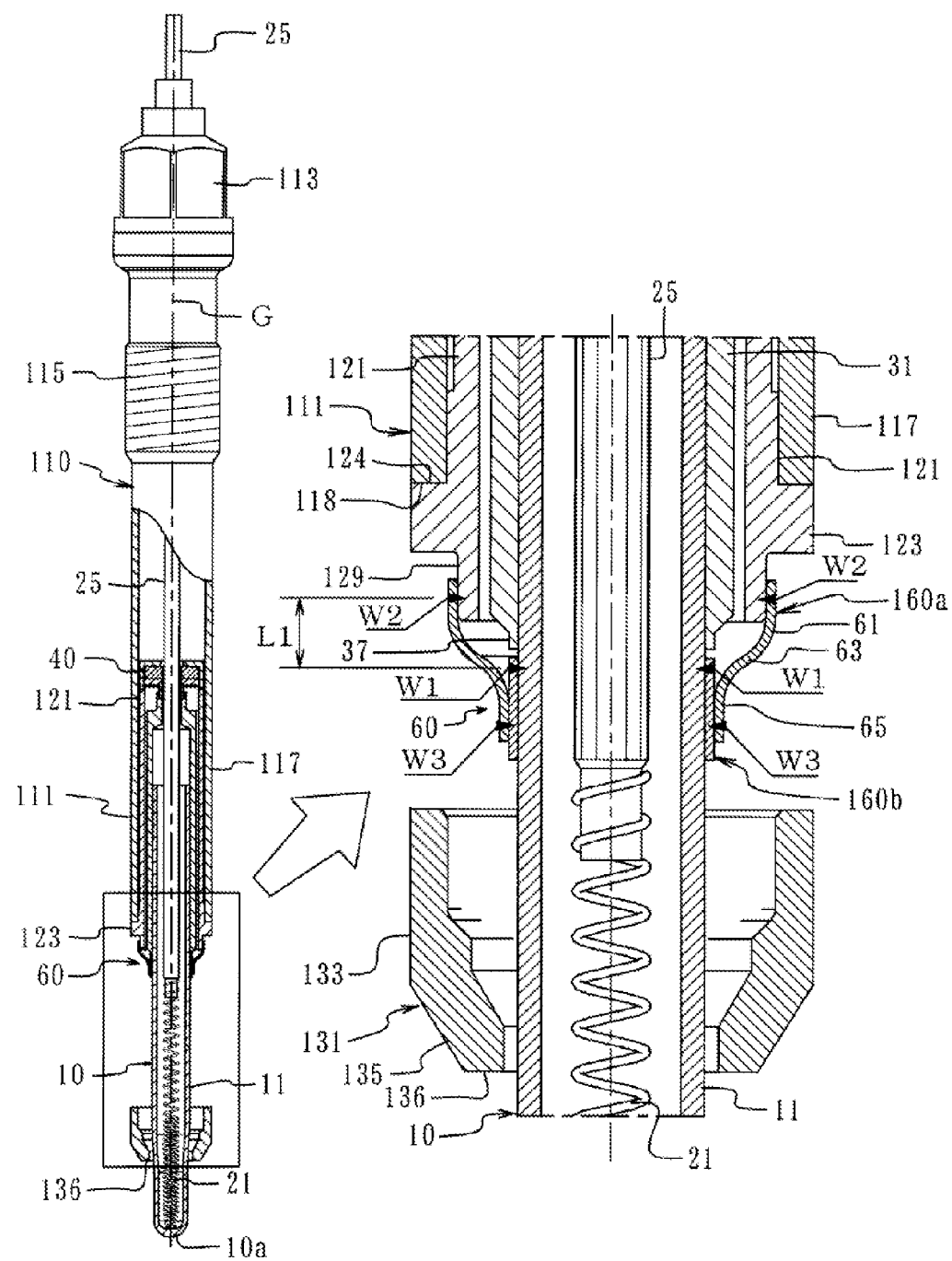
FIG. 5 Explanatory view for explaining an example step of assembly of the glow plug of FIG. 1, and an enlarged view of a portion of the explanatory view, showing fixation of the seal member (holding member).

A glow plug having a combustion pressure sensor according to an embodiment (first embodiment) of the present invention will be described with reference to FIGS. 1 to 5. A glow plug 101 of the present embodiment is composed primarily of a substantially cylindrical housing 110; a sheath heater 10 disposed in the housing 110 with its forward end (an illustrated lower end) 10a projecting from a forward end 136 of the housing 110; and a piezoelectric element 40 serving as a sensor and disposed at the rear end of the sheath heater 10. First, the overall configuration of the glow plug 101 will be described in detail with additional reference to FIGS. 4 and 5 showing an example assembly step.

In the present embodiment, the housing 110 includes a substantially cylindrical housing body 111; a sensor-supporting inner housing 121 inserted and disposed in the housing body 111 in such a manner as to support the piezoelectric element 40 at the rear end of the sheath heater 10; and a forward-end housing 131 located at a forward end portion of the housing body 111. The housing body 111 includes a screwing polygonal portion 113 provided on the outer circumferential surface of its rear end portion; a screw 115 adapted to be screwed into a cylinder head and provided on an outer circumferential surface located forward of the screwing polygonal portion 113; and a cylindrical portion 117 located forward of the screw 115 and having a diameter slightly smaller than the minor diameter of the screw 115. The sensor-supporting inner housing 121 is inserted and disposed along the inner circumferential surface of a forward portion of the cylindrical portion 117.

The sensor-supporting inner housing 121 is a cylindrical tube having an outside diameter slightly smaller than the inside diameter of the housing body 111 (see FIGS. 4 and 5) and includes a flange 123 projecting on the outer circumferential surface of its forward end portion. The flange 123 has the same outside diameter as that of the cylindrical portion 117 of the housing body 111, and, as shown in the enlarged view in FIG. 1 and others, the flange 123 is joined (hereinafter, referred to merely as "welded") to the housing body 111 by, for example, welding (specifically, laser welding) such that a rear end surface 124 of the flange 123 is in contact with a forward end 118 of the housing body 111. Meanwhile, as shown in the enlarged view in FIG. 1, a cylindrical cap 127 having an annular bottom plate 126 with a center opening is welded to a rear end 125 of the sensor-supporting inner housing 121 via the forward end of a cylindrical portion 128 of the cap 127. The annular piezoelectric element 40 sandwiched between insulation plates 47 via respective electrode plates 43 and 44 is disposed, within the cylindrical cap 127, in contact with the annular bottom plate 126. Although unillustrated, signal output leads extend rearward from the respective electrode plates 43 and 44.

Meanwhile, the sheath heater 10 includes a cylindrical sheath pipe 11 having a forward end 10a in the form of a hemispheric convex and extending rearward; a heat-generating coil 21 disposed in the sheath pipe 11 in such a manner as to extend rearward and connected to an inner forward end of the sheath pipe 11; and an electricity conduction rod (circular rod) 25 connected, within the sheath pipe 11, to the rear end of the heat-generating coil 21 and extending rearward. The electricity conduction rod 25 projects from the rear end of the sheath pipe 11. A sheath pipe sleeve 31 is externally fitted to a rear end portion of the sheath pipe 11 so as to hold the rear end of the sheath pipe 11 in a closed condition (see the right-hand figure in FIG. 4). The sheath heater 10 generally has a rodlike form and is disposed such that about a forward half of the sheath pipe 11 projects from the forward end 136 of the housing 110. Also, as shown in the enlarged view in FIG. 1, the sheath pipe sleeve 31 has a circular rear-end bottom portion 33 having a reduced inside diameter so as to allow the electricity conduction rod 25 to project therethrough and also has a cylindrical portion 35 projecting rearward from the rear end surface of the rear-end bottom portion 33. The sheath pipe sleeve 31 is held such that its forward end is located at substantially the same position as that of the forward end of the sensor-supporting inner housing 121 or slightly forward of the forward end of the sensor-supporting inner housing 121, and the sheath pipe sleeve 31 has a forward end portion in the form of a thin-walled portion 37 whose outside diameter is reduced. The thin-walled portion 37 is welded, for fixation, to the outer circumferential surface of the sheath pipe 11 along the circumferential direction. The sheath pipe sleeve 31 is disposed within the sensor-supporting inner housing 121 in a loose fit condition; i.e., a gap is formed between the sheath pipe sleeve 31 and the inner circumferential surface of the sensor-supporting inner housing 121.

Meanwhile, the electricity conduction rod 25 extends rearward in the housing 110 along an axis G of the housing 110 in such a manner as to extend through the cylindrical portion 35 at the rear end of the sheath pipe sleeve 31 and through (through holes of) a pressing member 50, which will be described below, disposed rearward of the cylindrical portion 35, the above-mentioned piezoelectric element 40, and the annular bottom plate 126 of the cylindrical cap 127. A rear end portion of the electricity conduction rod 25 is fixed at a rear end portion of the housing body 111 while being electrically insulated by an unillustrated insulation material or the like, and projects outward. Although unillustrated, an insulation powder is charged into the interior of the sheath pipe 11.

The pressing member 50 is disposed between the cylindrical portion 35 at a rear end portion of the sheath pipe sleeve 31 and the above-mentioned piezoelectric element 40 via the electrode plate 43 and the insulation plate 47 disposed at the forward end of the piezoelectric element 40, and the pressing member 50 has an annular plate portion 51 having substantially the same diameter as that of the insulation plate 47, and a small annular portion 53 concentrically extending forward from the annular plate portion 51. The small annular portion 53 of the pressing member 50 is coaxially fixed to the cylindrical portion 35 at a rear end portion of the sheath pipe sleeve 31. Incidentally, the sheath heater 10 is disposed in the sensor-supporting inner housing 121 in a loose fit condition while, as mentioned above, the forward end 10a of the sheath heater 10 projects from the forward end 136 of the tubular housing 110. Thus, the heater 10 is compressed along the direction of the axis G (rearward) by pressure generated as a result of combustion pressure pressing the heater 10 rearward from the forward end 10a, and the piezoelectric element 40 is compressed between the annular plate portion 51 of the pressing member 50 fixed to the cylindrical portion 35 at a rear end portion of the sheath pipe sleeve 31 and the annular bottom plate 126 of the annular cap 127 fixed to the rear end of the sensor-supporting inner housing 121. A voltage signal generated by this compression can be output from the electrode plates 43 and 44 via leads extending rearward. The leads from the electrode plates 43 and 44 extend outward through, for example, a space (gap) between the electricity conduction rod 25 and the inner wall of the annular bottom plate 126 of the cylindrical cap 127 while being electrically insulated.

In the glow plug 101 of the present embodiment, as mentioned above, the sensor-supporting inner housing 121 is fixed, by welding, to the housing body 111 such that the rear end surface 124 of the flange 123 projecting from the outer circumferential surface of a forward end portion of the sensor-supporting inner housing 121 is in contact with the forward end 118 of the housing body 111. Meanwhile, in the present embodiment, the sensor-supporting inner housing 121 has a cylindrical portion 129 located forward of the flange 123 and having an outside diameter smaller than that of the flange 123. Although described in detail later, one tubular seal member (which corresponds to one tubular holding member in the present invention and is, in the present embodiment, an outer tubular seal member) 160a, which partially constitutes a holding member 60 having a dual-tube structure consisting of inner and outer tubular holding members, is externally fitted, at its rear end portion, to the cylindrical portion (a cylindrical portion for fixing the holding member (in the present embodiment, the seal member)) 129 and is welded from outside at a predetermined position W2 as illustrated by a black triangle (see FIG. 3). In the present embodiment and the embodiments appearing below, since the "holding member" is a seal member, the "holding member" is referred to as the "seal member."

The forward-end housing 131 is externally fitted, at its rear-end cylindrical portion (housing-side cylindrical portion) 133, to a rear end portion of the thus-welded outer tubular seal member 160a, and a rear end surface 132 of the forward-end housing 131 is brought in contact with and welded to a forward end surface (annular surface) 122 of the flange 123. A forward end portion of the forward-end housing 131 is a taper tube portion 135 whose outer circumferential surface is a taper surface which tapers forward; the diameter of the inner circumferential surface (inside diameter) D1 of a forward end 136 of the forward-end housing 131 is determined so as to form a small annular gap K1 in cooperation with the outer circumferential surface of the heater 10; an annular gap K2 greater in diameter than the annular gap K1 is located rearward of the annular gap K1 and formed between the inner circumferential surface of the forward-end housing 131 and the outer circumferential surface of the heater 10; and, in the present embodiment, the seal member 60 consists of the above-mentioned one tubular seal member (outer tubular seal member) 160a and the other tubular seal member (which corresponds to the other tubular holding member in the present invention and is, in the present embodiment, an inner tubular seal member) 160b externally fixed to the heater 10 by welding to the outer circumferential surface of the heater 10 along the circumferential direction, and the seal member 60 partitions the annular gap into axially forward and rearward parts as will be described below. The outer tubular seal member 160a and the inner tubular seal member 160b are formed from the same material; for example, SUS630 or INCONEL 718 (trademark); however, the present invention is not limited thereto.

In the present embodiment, the outer tubular seal member 160a includes a large-diameter cylindrical portion 61 located on a side toward the rear end and having such a relatively large diameter as to be accommodated within the diameter-expanding annular space K2, and a small-diameter cylindrical portion (annular portion) 65 located on a side toward the forward end and having a relatively small diameter. A portion of the outer tubular seal member 160a between the two cylindrical portions 61 and 65 is an annular membrane 63 which has a curved section and is formed from a metal membrane in such a manner as to be axially deformable as is a diaphragm. The large-diameter cylindrical portion 61 is, as mentioned above, externally fitted to the seal-member-fixing cylindrical portion 129 located forward of the flange 123 of the sensor-supporting inner housing 121 and is welded from outside to the cylindrical portion 129 at the illustrated predetermined position W2 along the circumferential direction, thereby forming a housing-side joint W2.

Meanwhile, the inner tubular seal member 160b has an inter-tubular-seal-member joint (which corresponds to the inter-tubular-holding-member joint in the present invention) formed by welding from outside a forward end portion of the outer tubular seal member 160a to a forward end portion of the inner tubular seal member 160b at a predetermined position W3 along the circumferential direction, thereby providing a seal therebetween. As illustrated, only the joints W1 to W3 formed by welding are represented by black triangles, and the tubular seal members are fixed by welding only at the three positions marked by the black triangles. The inner tubular seal member 160b is welded to the outer circumferential surface of the heater 10 along the circumferential direction at its predetermined position W1 located rearward of the inter-tubular-seal-member joint W3, thereby forming a heater-side joint W1. Thus, even though combustion gas enters the diameter-expanding annular space K2 from the forward end 136 of the forward-end housing 131 through the annular gap K1 between the inner circumferential surface of the forward end 136 and the outer circumferential surface of the heater 10, the seal member 60 prevents further rearward entry of the combustion gas.

In the present embodiment, the heater-side joint W1 is located forward of the housing-side joint W2; however, according to the above-mentioned configuration, an axial distance (joint-to-joint dimension) L1 between the joints W1 and W2 is smaller than an axial distance (joint-to-joint dimension) between the housing-side joint W2 and the inter-tubular-seal-member joint W3, which corresponds to the conventional heater-side joint W1. The inner tubular seal member 160b assumes the form of such a straight tube (cylindrical tube) as to be able to be externally fitted to the heater 10; therefore, an inner circumferential surface of the inner tubular seal member 160b located forward of the heater-side joint W1 is merely in contact with or forms a gap (small gap) in cooperation with the outer circumferential surface of the heater 10. The small-diameter cylindrical portion (annular portion) 65 located on the side toward the forward end of the outer tubular seal member 160a has such an inside diameter as to be able to be externally fitted to the inner tubular seal member 160b.

When the glow plug 101 of the present embodiment is mounted to the cylinder head of an engine and brought into use, combustion gas presses the heater 10 rearward from the forward end 10a. Pressure generated by the press compresses the piezoelectric element 40 sandwiched between the annular bottom plate 126 of the cylindrical cap 127 fixed to the rear end of the sensor-supporting inner housing 121 and the annular plate portion 51 of the pressing member 50 fixed to the cylindrical portion 35 at a rear end portion of the sheath pipe sleeve 31; is output in the form of a voltage signal generated by the compression; and is detected from the voltage signal. In this regard, the heater 10 is displaced rearward by a very small amount, and mainly the annular membrane 63 of the outer tubular seal member 160a is deformed to thereby allow the displacement. In the present embodiment, the annular membrane 63 has a longitudinal section curved in a forward taper shape; however, the shape and structure of the annular membrane 63 may be determined as appropriate, so long as the displacement is allowed.

In the present embodiment, as described above, the seal member 60 disposed in the annular gap has the dual-tube structure consisting of inner and outer tubes such that the housing-side joint W2 and the heater-side joint W1 are positioned with the inter-tubular-seal-member joint W3 as the turn; thus, the axial dimension L1 between the housing-side joint W2 and the heater-side joint W1 can be smaller than that in the conventional case of using only a single tubular seal member. Therefore, even though the tubular seal members 160a and 160b which constitute the dual-tube structure instantaneously assume high temperature, quicker than do other members, and undergo instantaneous thermal expansion in the axial direction as a result of high-temperature, high-pressure combustion gas hitting directly the seal member 60 in the process of a combustion cycle of an engine, an increase in the axial dimension L1 due to thermal expansion can be smaller than an increase in the overall axial length of the outer tubular seal member 160a due to thermal expansion. Thus, according to the present embodiment, since an action of the holding member 60 pressing the heater 10 forward as a result of its thermal expansion can be mitigated more than in the case of the conventional member, the problem of generation of drift in detection of combustion pressure can be mitigated accordingly; therefore, accuracy in sensing combustion pressure can be enhanced. The smaller the axial dimension L1, the more an action of pressing the heater 10 forward can be mitigated.

Figure 1:
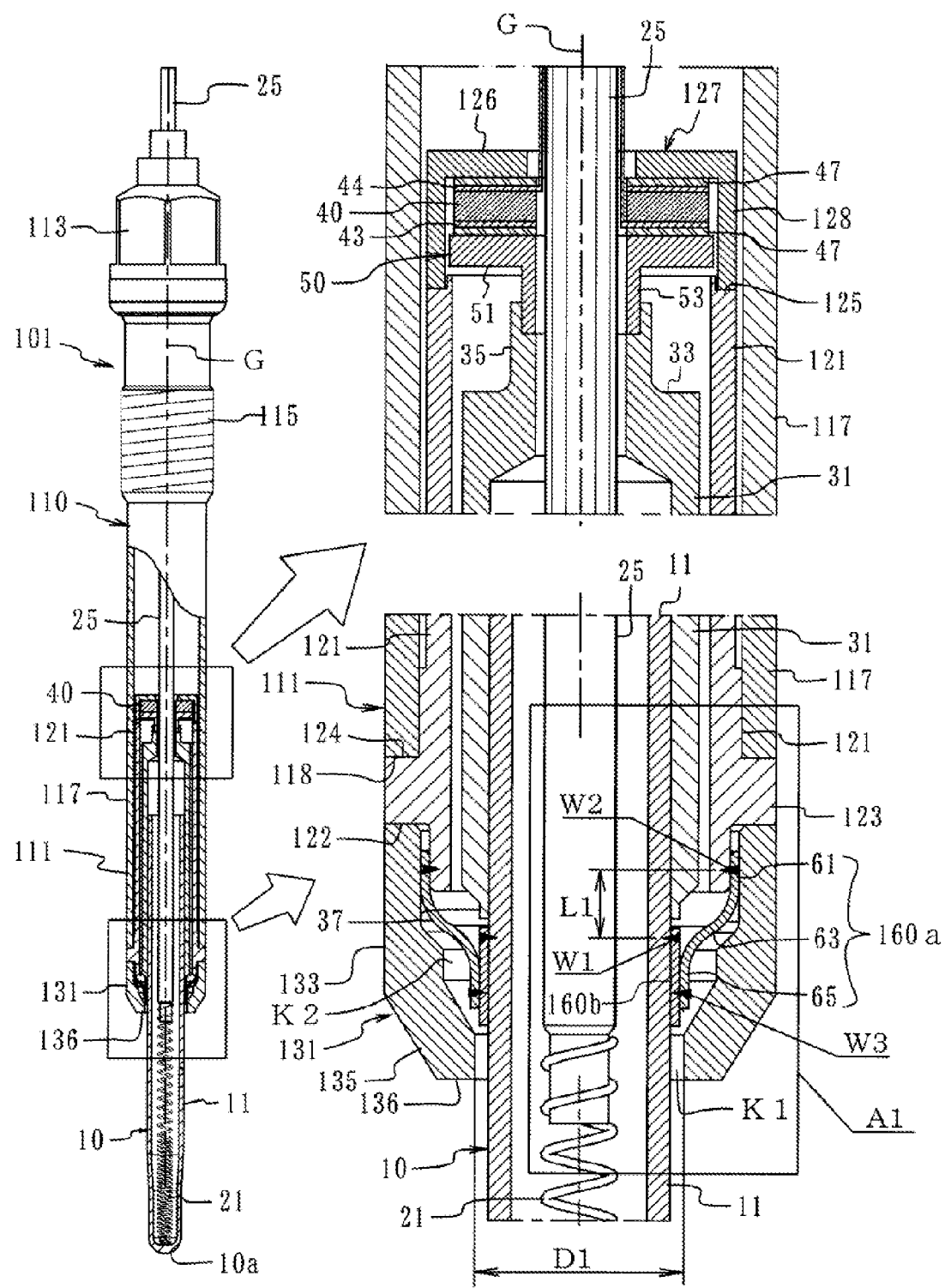
FIG. 1 Partially sectional view showing a glow plug having a combustion pressure sensor according to an embodiment (first embodiment) of the present invention, and an enlarged view of essential members of the glow plug.

The glow plug 101 of the present embodiment can be assembled, for example, as follows (see FIGS. 4 and 5). As shown at the center or at the right of FIG. 4, the sheath heater 10 is assembled by inserting the heat-generating coil 21 and a forward end portion of the electricity conduction rod 25 into the sheath pipe 11, charging an unillustrated insulation powder into the sheath pipe 11, etc. The sheath pipe sleeve 31 is externally fitted and fixed to a rear portion of the sheath pipe 11. The cylindrical cap 127 which contains the piezoelectric element 40 is assembled to the rear end 125 of the sensor-supporting inner housing 121. The resultant assembly is externally fitted to the sheath pipe sleeve 31 (see the left figure in FIG. 5). Next, as shown in FIG. 5, the inner tubular seal member 160b is welded, at its rear predetermined position W1, to the heater 10 to which the inner tubular seal member 160b is externally fitted; the outer tubular seal member 160a externally fitted to the inner tubular seal member 160b is welded, at its forward predetermined position W3, to the inner tubular seal member 160b at its forward predetermined position W3; and a rear end portion of the outer tubular seal member 160a is, as mentioned above, externally fitted to the seal-member-fixing cylindrical portion 129 located forward of the flange 123 of the sensor-supporting inner housing 121 and is welded to the cylindrical portion 129 at the predetermined position W2. Subsequently, the housing body 111 and the forward-end housing 131 are externally fitted to the resultant assembly from the rear side and from the forward side, respectively, such that the flange 123 is sandwiched between the respective end surfaces; the resultant contact surfaces are welded from outside along the circumferential direction; and other relevant steps are carried out, whereby the glow plug 101 is assembled as shown in FIG. 1.

Figure 2:
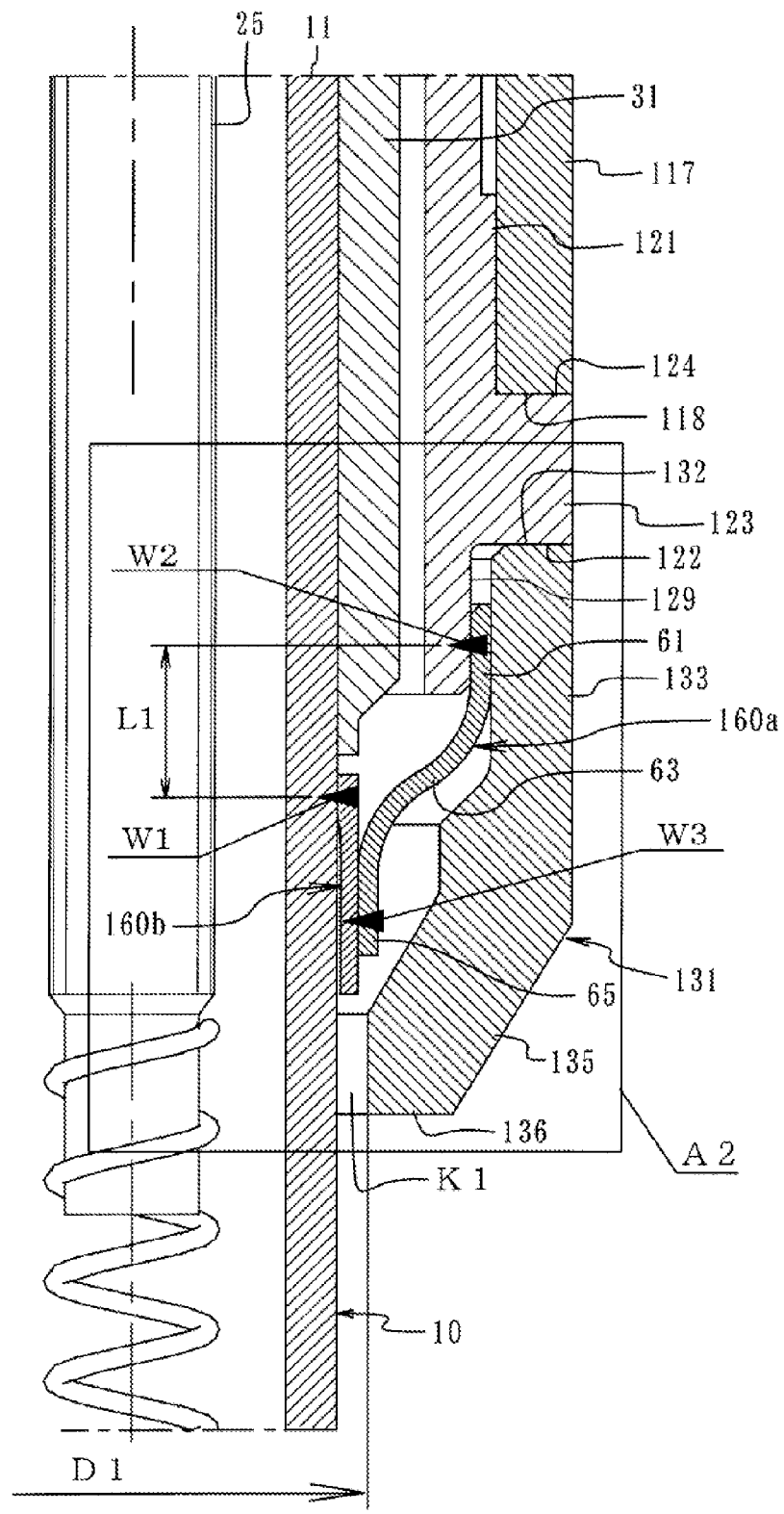
FIG. 2 Further enlarged view of region A1 (showing, on an enlarged scale, essential members including a holding member (a seal member in the present embodiment) of FIG. 1.
Figure 3:
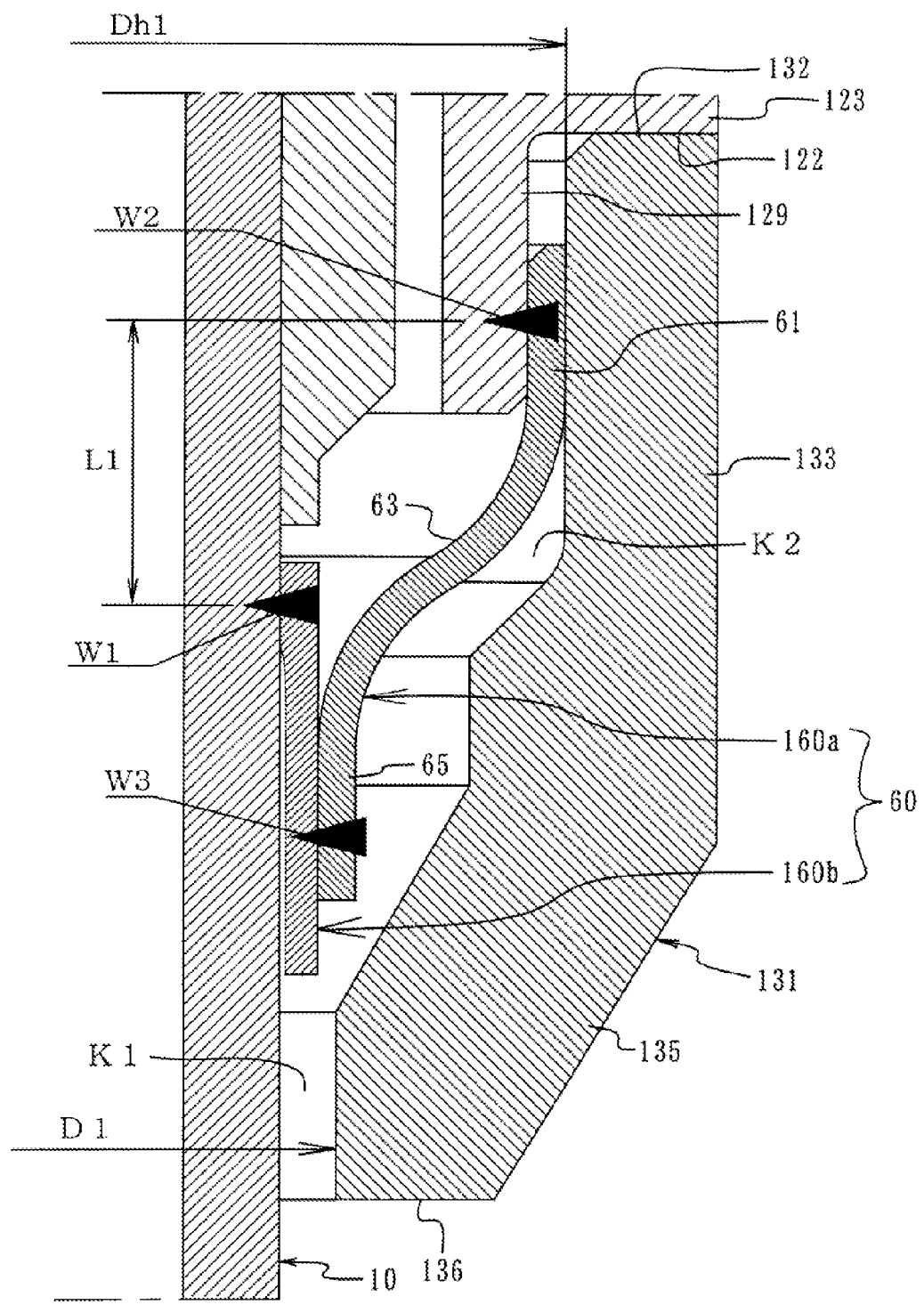
FIG. 3 Further enlarged view of region A2 of FIG. 2.
Figure 6:
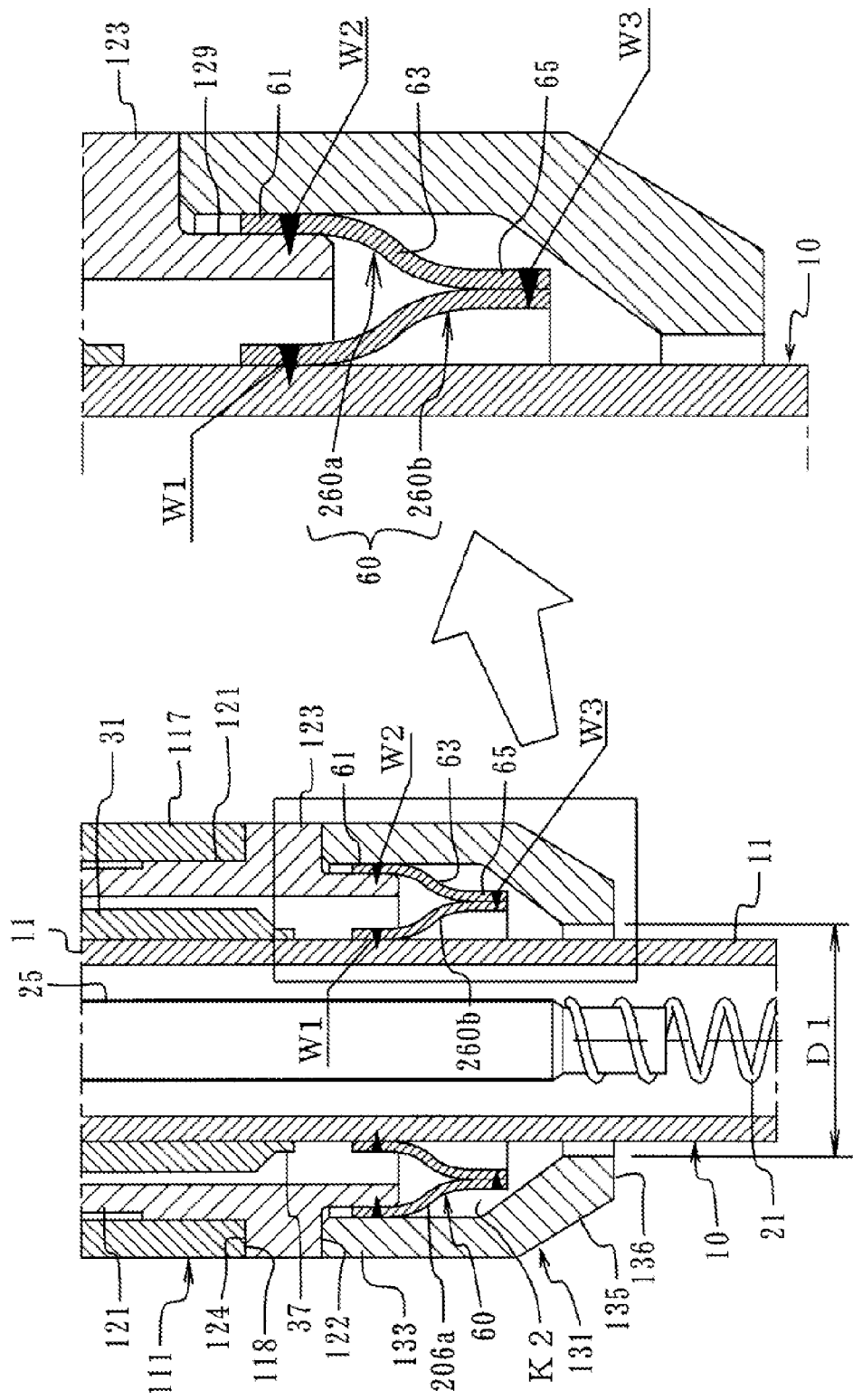
FIG. 6 Enlarged view of essential members of a glow plug having a combustion pressure sensor according to a second embodiment of the present invention, and a further enlarged view of the essential members.

Next, a glow plug according to another embodiment (second embodiment) of the present invention is described with reference to FIG. 6. An essential difference does not exist between the glow plug of the present embodiment and the above-described glow plug of the first embodiment, and, as shown in FIG. 6, an enlarged view corresponding to that of FIG. 2 showing essential members, since the embodiments substantially differ only in the sectional shape of the seal member 60 having a dual-tube structure consisting of inner and outer tubes, only points of difference will be described while like components are denoted by like reference numerals. Specifically, in the present embodiment, in contrast to the seal member 60 in the above-described first embodiment, two tubular seal members 260a and 260b have the same axial length. One tubular seal member; i.e., the outer tubular seal member 260a has a longitudinal section similar to that in the first embodiment, and the rear-side large-diameter cylindrical portion 61 of the outer tubular seal member 260a is externally fitted to the cylindrical portion 129 located forward of the flange 123 of the sensor-supporting inner housing 121 and is welded at the predetermined position W2. The other tubular seal member; i.e., the inner tubular seal member 260b has a small-diameter cylindrical portion formed at its rear end portion and having a diameter smaller than that of its forward end portion, and the small-diameter cylindrical portion is welded, at its rear predetermined position W1, to the outer circumferential surface of the heater 10 along the circumferential direction, thereby forming the heater-side joint W1. In the present embodiment, the joints W1 and W2 are located at substantially the same axial position; the small-diameter cylindrical portion 65 formed at a forward end portion of the outer tubular seal member 260a has an inside diameter substantially equal to the outside diameter of a large-diameter cylindrical portion formed at a forward end portion of the inner cylindrical seal member 260b; and the small-diameter cylindrical portion 65 of the outer tubular seal member 260a and the large-diameter cylindrical portion of the inner cylindrical seal member 260b are welded together at their forward predetermined position W3 by welding along the circumferential direction from a side toward the small-diameter cylindrical portion 65 of the outer tubular seal member 260a, thereby forming the inter-tubular-seal-member joint W3. That is, according to the present embodiment, since the axial dimension L1 between the housing-side joint W2 and the heater-side joint W1 is zero or substantially zero, even though the inner and outer tubular seal members 260a and 260b of the seal member 60 having a dual-tube structure undergo instantaneous thermal expansion greatly in the axial direction, an action of pressing the heater 10 forward can be substantially nullified.

Figure 7:
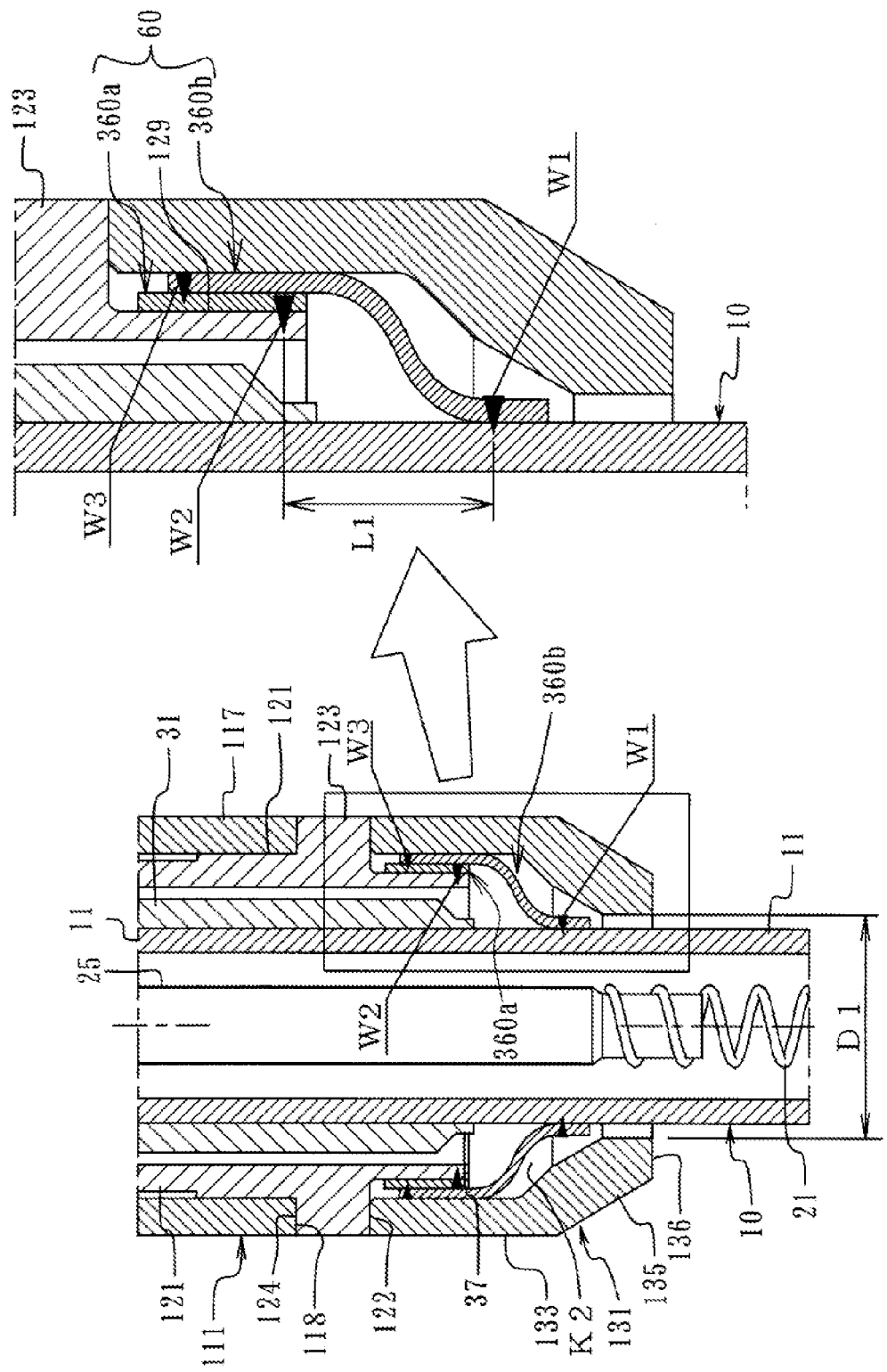
FIG. 7 Enlarged view of essential members of a glow plug having a combustion pressure sensor according to a third embodiment of the present invention, and a further enlarged view of the essential members.

Next, a glow plug according to a further embodiment (third embodiment) of the present invention is described with reference to FIG. 7 showing essential members of the glow plug. An essential difference does not exist between the glow plug of the present embodiment and the above-described glow plug of the first embodiment, and, as shown in FIG. 7, an enlarged view corresponding to that of FIG. 2 showing essential members, since the embodiments substantially differ only in the sectional shape of the seal member 60 having a dual-tube structure consisting of inner and outer tubes, only points of difference will be described while like components are denoted by like reference numerals. Specifically, in the present embodiment, one tubular seal member (in the present embodiment, an inner tubular seal member) 360a which partially constitutes the seal member 60 having a dual-tube structure consisting of inner and outer tubes has a mere cylindrical shape; is externally fitted to the seal-member-fixing cylindrical portion 129 located forward of the flange 123 of the sensor-supporting inner housing 121; and is welded from outside to the housing (the cylindrical portion 129) along the circumferential direction at the illustrated predetermined position W2 located at a forward end portion of the one tubular seal member 360a, thereby forming the housing-side joint W2. The other tubular seal member (in the present embodiment, an outer tubular seal member) 360b has a sectional shape similar to that of the outer tubular seal member 160a having the housing-side joint W2 in the first embodiment, but is welded, at its rear predetermined position W3, to a rear end portion of the above-mentioned one tubular seal member (in the present embodiment, the inner tubular seal member) 360a along the circumferential direction, thereby forming the inter-tubular-seal-member joint W3; furthermore, the outer tubular seal member 360b is welded, at its predetermined position W1 located forward of the position W3, to the outer circumferential surface of the heater 10 along the circumferential direction, thereby forming the heater-side joint W1. Thus, the axial dimension L1 between the heater-side joint W1 and the housing-side joint W2 is smaller than the axial dimension between the joints W1 and W3.

Also, according to the present embodiment, as compared with the axial dimension between the heater-side and housing-side joints in the conventional case where only a single tubular seal member is used and welded at its predetermined forward and rear positions, the axial dimension L1 between the housing-side joint W2 and the heater-side joint W1 can be reduced similar to the case of the above-described first embodiment. Thus, even though the seal member 60 undergoes instantaneous thermal expansion greatly in the axial direction, an action of pressing the heater 10 forward can be mitigated. In order to ensure this effect, different from other embodiment, in the present third embodiment, the inner tubular seal member 360a is formed from SUS304, and the outer tubular seal member 360b is formed from SUS630 or INCONEL 718 (trademark), whereby the inner tubular seal member 360a is higher in thermal expansion coefficient than the outer tubular seal member 360b. In the present embodiment, different from the above-described first embodiment, the inter-tubular-seal-member joint W3 is provided at rear end portions of the tubular seal members, and the housing-side joint W2 is provided at a forward end portion of the inner tubular seal member 360a; therefore, for example, the following welding procedure may be employed: the inner tubular seal member 360a is first welded at its forward predetermined position W2, thereby forming the housing-side joint W2; subsequently, the outer tubular seal member 360b is welded, at its rear end portion, to a rear end portion of the inner tubular seal member 360a, and is welded, at its forward predetermined position W1, to the outer circumferential surface of the heater 10. Notably, the welding procedure may be determined as appropriate.

Figure 8:
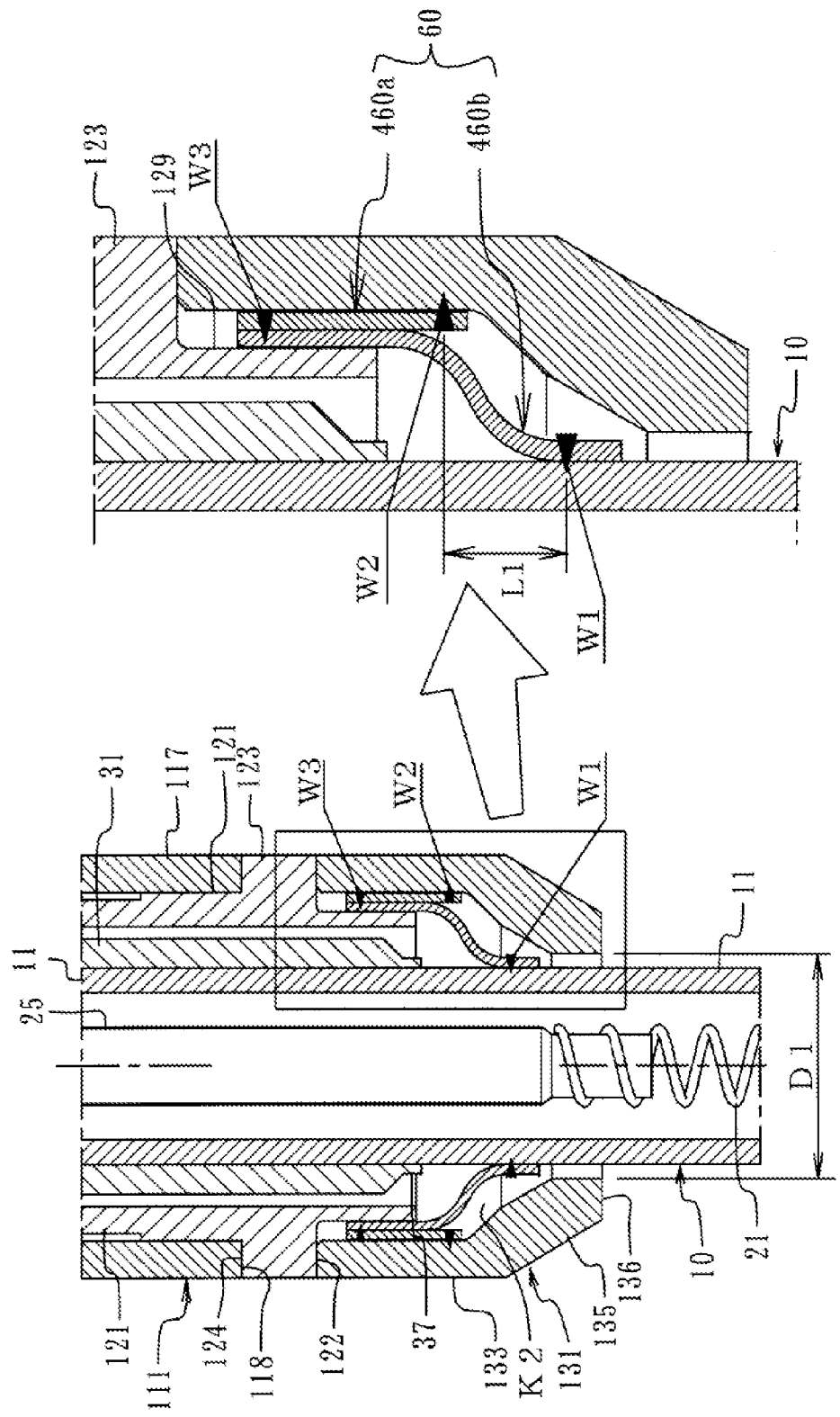
FIG. 8 Enlarged view of essential members of a glow plug having a combustion pressure sensor according to a fourth embodiment of the present invention, and a further enlarged view of the essential members.
Figure 9:
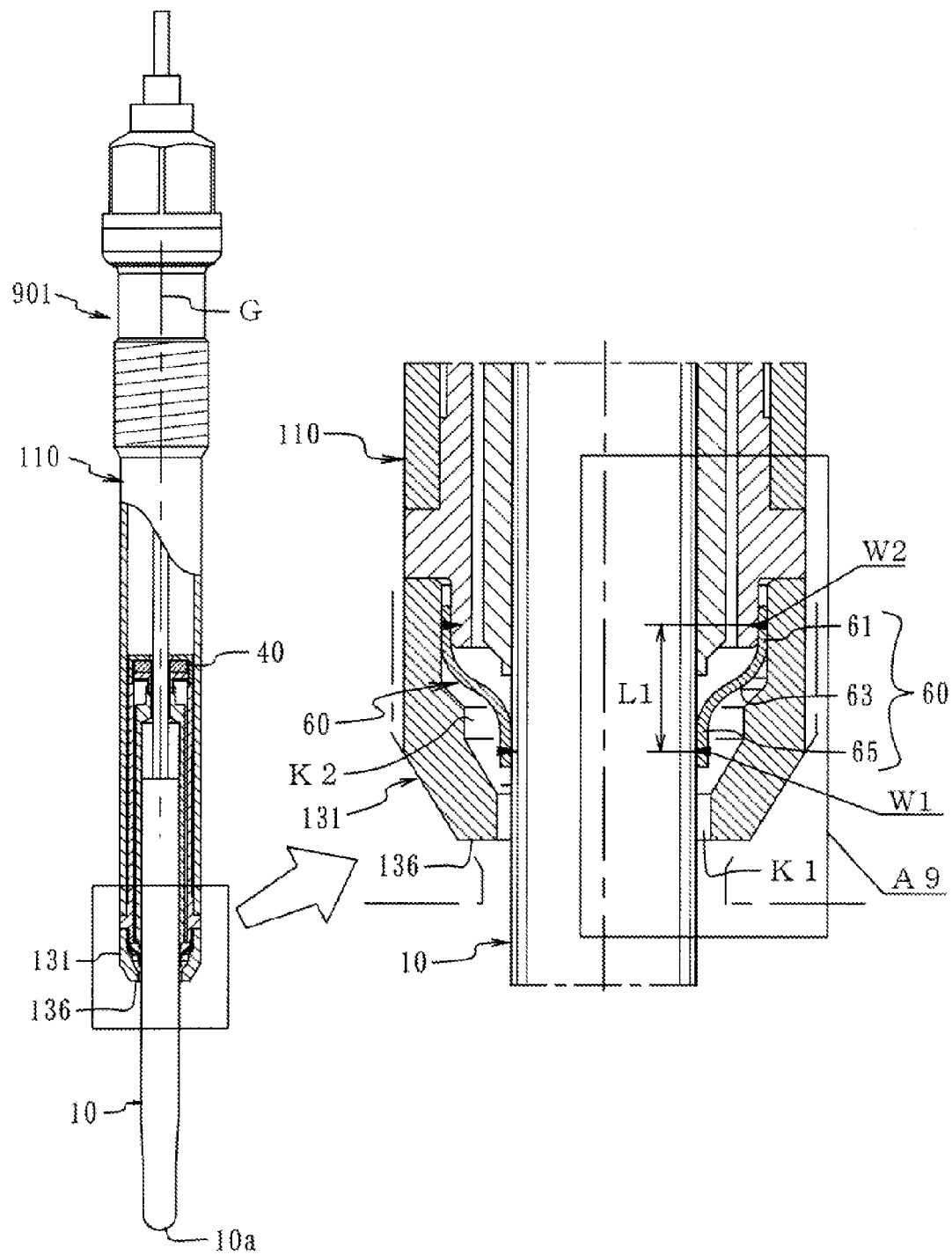
FIG. 9 Longitudinal, partially sectional view showing an example of a conventional glow plug having a combustion pressure sensor, and an enlarged view of a portion of the sectional view, showing a seal member, etc.
Figure 10:
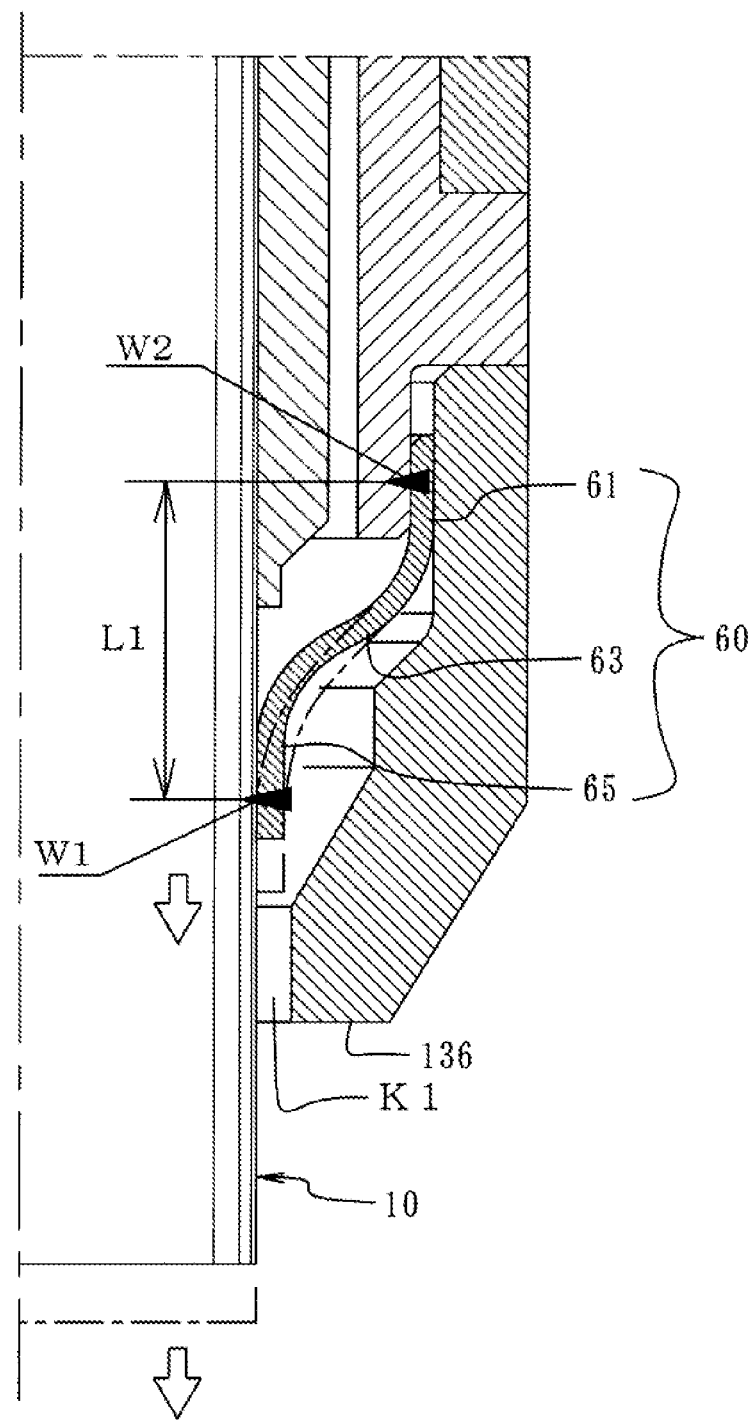
FIG. 10 Enlarged view of region A9 of FIG. 9 for explaining a problem involved in the glow plug of FIG. 9.

FIG. 8 shows essential members of a glow plug according to a still further embodiment (fourth embodiment) of the present invention; the present embodiment can be said to be a modification of the above-described third embodiment and does not differ essentially from the third embodiment; as shown in FIG. 8, one tubular seal member 460a having the housing-side joint W2 of the seal member 60 having a dual-tube structure consisting of inner and outer tubes is an outer tubular seal member in contrast to the third embodiment and is welded, at its forward predetermined position W2, to the inner circumferential surface of the forward-end housing 131, thereby forming the housing-side joint W2; the outer tubular seal member 460a is welded, at its rear end portion, to the other tubular seal member (inner tubular seal member) 460b at the rear predetermined position W3, thereby forming the inter-tubular-seal-member joint W3; and the inner tubular seal member 460b is welded, at its forward predetermined position W1, to the outer circumferential surface of the heater 10. That is, the present embodiment differs from the third embodiment only in that the tubular seal member having the heater-side joint and the tubular seal member having the housing-side joint are provided inside out; therefore, the present embodiment apparently yields effect similar to that yielded by the third embodiment.

As mentioned above, according to the present invention, the holding member (in the above-described embodiments, the seal member) has a dual-tube structure consisting of inner and outer tubular members. For example, in the first and second embodiments (FIG. 1), one tubular seal member is welded, at its rear end portion, to the housing along the circumferential direction, thereby forming the housing-side joint; the other tubular seal member is welded, at its forward end portion, to a forward end portion of the one tubular seal member along the circumferential direction, thereby forming the inter-tubular-seal-member joint; and the other tubular seal member is welded, at its portion located rearward of the inter-tubular-seal-member joint, to the outer circumferential surface of the heater along the circumferential direction, thereby forming the heater-side joint. In this case, the one tubular seal member having the housing-side joint is the outer tubular seal member, and the other tubular seal member having the heater-side joint is the inner seal member; however, as shown in the third embodiment (FIG. 7), the one tubular seal member having the housing-side joint can be the inner tubular seal member.

Also, in the first embodiment (FIG. 1), the tubular seal members have the housing-side joint and the heater-side joint at their respective rear end portions; however, as shown in the third and fourth embodiments (FIG. 8), the tubular seal members may have the joints at their forward end portions. As mentioned above, preferably, the axial distance L1 between the housing-side joint and the heater-side joint is reduced in order to mitigate an action of pressing the heater forward. In FIG. 1, the heater-side joint is located forward of the housing-side joint; however, the positional relationship of these joints can be axially reversed.

In the above-described embodiments (first to fourth embodiments), the holding member is the seal member. Thus, the tubular holding members; i.e., the two tubular seal members are joined, at the respective joints, to the housing and to the heater continuously along the entire circumference. However, in the case where, in the present invention, the holding member is not required to provide a seal; i.e., the holding member plays only a role of holding the heater, the circumferential joints may be formed continuously along the entire circumference or may be formed discontinuously. For example, the joints may be formed at circumferential intervals; for example, at four positions in a spotlike manner. Although the joints are formed continuously along the circumferential direction, the joints may not be formed continuously along the entire circumference. The joints may be formed continuously along the circumferential direction within an angular range of, for example, three-fourths (270 degrees) of full circle (360 degrees).

In the above-described embodiments, the sensor is the piezoelectric element; however, the sensor may be of any type, so long as the sensor can sense combustion pressure from pressure generated as a result of combustion gas pressing the heater rearward or from axial displacement of the heater caused by the pressure; therefore, for example, the present invention can be applied to the case where a strain sensor is used. In the glow plugs of the above-described embodiments, the heater is composed of the sheath pipe, etc., and the housing is composed of the housing body, the forward-end housing, etc.; however, the present invention can be embodied such that the heater and the housing are configured as appropriate. Furthermore, in the above-described embodiments, welding is used as "joining" means for the tubular seal member (holding member); in this case, welding may be of any appropriate type, such as laser welding, electron beam welding, or resistance welding; and joining means is not limited to welding. Joining means other than welding may be used as appropriate and include tight fitting, such as crimping and press fitting as mentioned above, and brazing by use of a brazing metal.

DESCRIPTION OF REFERENCE NUMERALS

10: heater
10a: forward end of heater
40: piezoelectric element (sensor)
101: glow plug having combustion pressure sensor
110: housing
111: housing body
121: sensor-supporting inner housing
131: forward-end housing
136: forward end of housing
160, 260, 360, 460: seal member (holding member)
160a, 260a: one tubular seal member (tubular holding member)
160b, 260b: the other tubular seal member (tubular holding member)
G: axis of heater
K1: annular gap between inner circumferential surface of forward end of housing and outer circumferential surface of heater
K2: diameter-expanding annular space
W1: heater-side joint
W2: housing-side joint
W3: inter-tubular-seal-member joint (inter-tubular-holding-member joint)

The invention claimed is:

1. A glow plug having a combustion pressure sensor in which a rodlike heater is disposed in a tubular housing in an axially displaceable manner with its forward end projecting from a forward end of the housing and with a gap retained between an inner circumferential surface of the housing and an outer circumferential surface of the heater and which has a sensor capable of sensing combustion pressure through detection of pressure or displacement generated as a result of the combustion pressure pressing the heater rearward from the forward end of the heater, wherein a holding member in a tubular shape formed in a deformable manner so as to allow the displacement of the heater and externally fitted to the heater so as to hold the heater is disposed in an annular gap between the outer circumferential surface of the heater and an inner circumferential surface of a forward end of the housing or a portion of the housing located toward the forward end of the housing, in such a manner as to partition the annular gap into axially forward and rearward parts, and is joined to the housing and to the heater along a circumferential direction, the glow plug being characterized in that the holding member has a dual-tube structure consisting of an inner tubular holding member and an outer tubular holding member;

one tubular holding member is joined, at its rear end portion, to the housing along the circumferential direction, thereby forming a housing-side joint;

the other tubular holding member is joined, at its forward end portion, to a forward end portion of the one tubular holding member along the circumferential direction, thereby forming an inter-tubular-holding-member joint; and the other tubular holding member is joined, at its portion located rearward of the inter-tubular-holding-member joint, to the outer circumferential surface of the heater along the circumferential direction, thereby forming a heater-side joint.

2. A glow plug having a combustion pressure sensor according to claim 1, wherein either one of the one tubular holding member and the other tubular holding member has such a cylindrical shape as to have a substantially fixed diameter along the axial direction, and the remaining one has such a tubular bell shape as to differ in diameter along the axial direction.

3. A glow plug having a combustion pressure sensor according to claim 1, wherein the one tubular holding member and the other tubular holding member differ in axial length, and a material used to form the axially shorter tubular holding member is higher in thermal expansion coefficient than a material used to form the axially longer tubular holding member.

4. A glow plug having a combustion pressure sensor in which a rodlike heater is disposed in a tubular housing in an axially displaceable manner with its forward end projecting from a forward end of the housing and with a gap retained between an inner circumferential surface of the housing and an outer circumferential surface of the heater and which has a sensor capable of sensing combustion pressure through detection of pressure or displacement generated as a result of the combustion pressure pressing the heater rearward from the forward end of the heater, wherein a holding member in a tubular shape formed in a deformable manner so as to allow the displacement of the heater and externally fitted to the heater so as to hold the heater is disposed in an annular gap between the outer circumferential surface of the heater and an inner circumferential surface of a forward end of the housing or a portion of the housing located toward the forward end of the housing, in such a manner as to partition the annular gap into axially forward and rearward parts, and is joined to the housing and to the heater along a circumferential direction, the glow plug being characterized in that the holding member has a dual-tube structure consisting of an inner tubular holding member and an outer tubular holding member;

one tubular holding member is joined, at its forward end portion, to the housing along the circumferential direction, thereby forming a housing-side joint;

the other tubular holding member is joined, at its rear end portion, to a rear end portion of the one tubular holding member along the circumferential direction, thereby forming an inter-tubular-holding-member joint; and the other tubular holding member is joined, at its portion located forward of the inter-tubular-holding-member joint, to the outer circumferential surface of the heater along the circumferential direction, thereby forming a heater-side joint.

5. A glow plug having a combustion pressure sensor according to claim 4, wherein either one of the one tubular holding member and the other tubular holding member has such a cylindrical shape as to have a substantially fixed diameter along the axial direction, and the remaining one has such a tubular bell shape as to differ in diameter along the axial direction.

6. A glow plug having a combustion pressure sensor according to claim 4, wherein the one tubular holding member and the other tubular holding member differ in axial length, and a material used to form the axially shorter tubular holding member is higher in thermal expansion coefficient than a material used to form the axially longer tubular holding member.

\* \* \* \* \*